June 2, 1936.  A. B. FAY  2,042,885
DRAFTING APPARATUS
Filed March 8, 1935   2 Sheets-Sheet 1

Inventor
Allan B. Fay
By Stone, Boyden & Mack
Attorneys

Patented June 2, 1936

2,042,885

UNITED STATES PATENT OFFICE 2,042,885

DRAFTING APPARATUS

Allan B. Fay, Washington, D. C.

Application March 8, 1935, Serial No. 10,111

6 Claims. (Cl. 33—93)

This invention relates generally to drafting apparatus for rapidly and accurately plotting points with respect to a system of fixed rectilinear coordinate axes.

More particularly it relates to apparatus which may be adjusted in order to determine the ordinate or abscissa of a point in units commensurable with the distance between parallel coordinates.

As will be seen hereinafter this invention finds especial adaptability in the making of maps and particularly use with polyconic projections.

It is an object of this invention to provide simple and accurate means for measuring the ordinate and abscissa of a point in fractions of the particular quadrangle in which the point is being plotted.

Yet another object of the invention is to provide apparatus which is simply and accurately adjustable in order that it may be used with equal efficiency in quadrangles of various sizes.

Still further the invention contemplates the provision of a pair of graduated scales pivoted to a central member. The central member has two straight edges. The scales are pivoted in such a manner that the axis of each pivot lies in the same vertical plane as one of these straight edges in order that, as the graduations on the scales are used for measuring distances from the straight edge, the zero point will always lie in the plane of the straight edge irrespective of the angular position to which the scale is adjusted.

Many other and further objects of the invention will become apparent from the following specification when considered in connection with the accompanying drawings.

Figure 1:
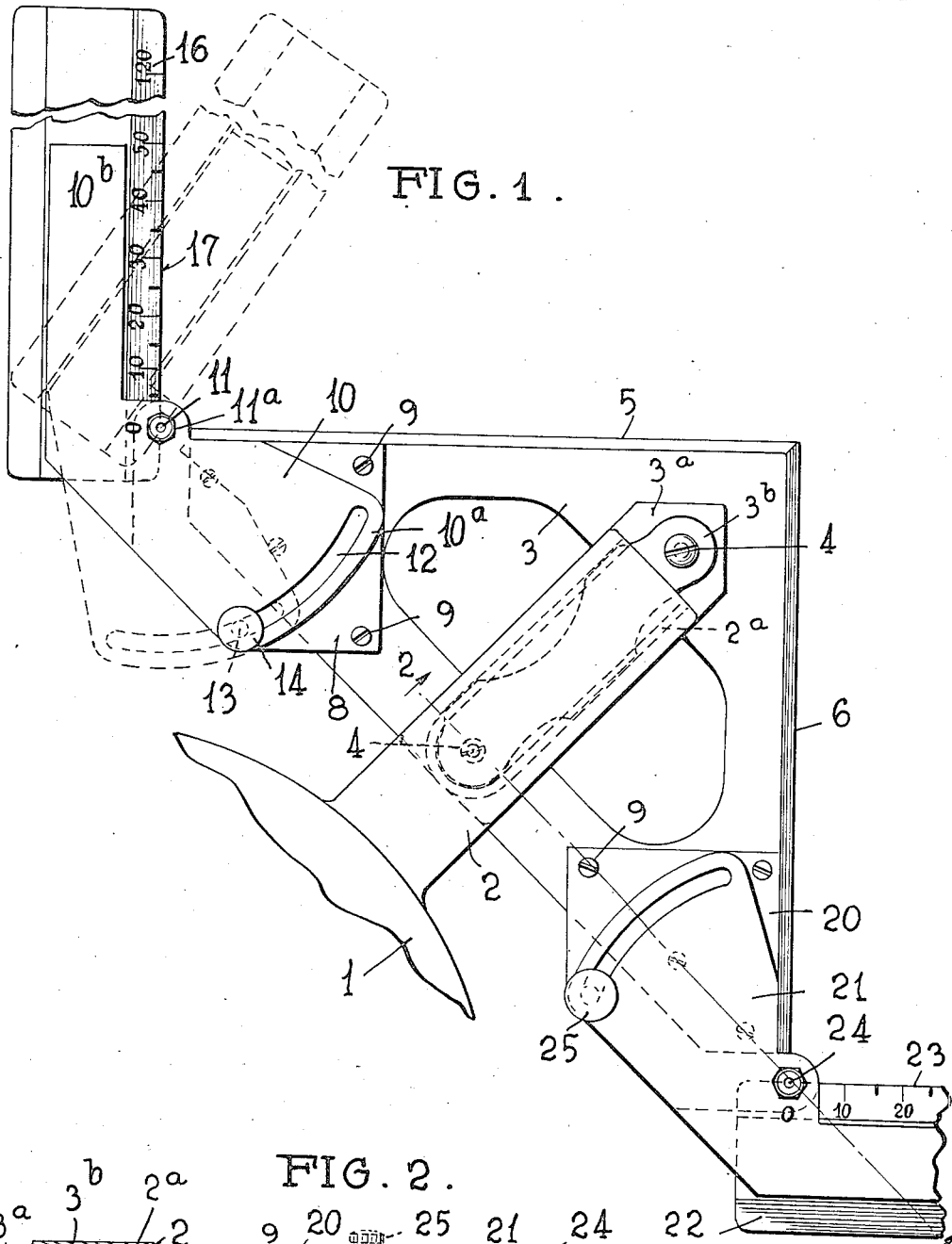
Figure 1 is a plan view of the improved apparatus, showing it connected to a universal drafting machine of conventional design.
Figure 2:
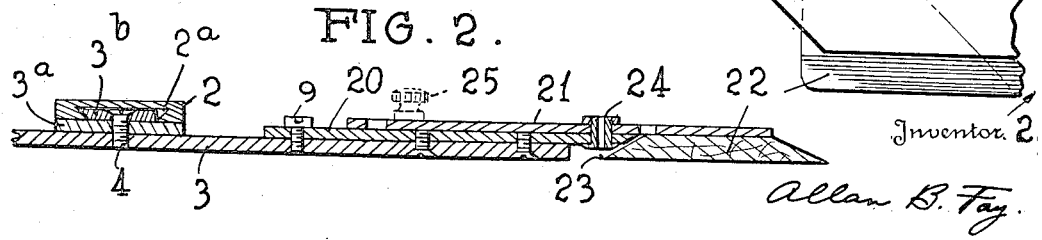
Figure 2 is a sectional view taken on the line 2—2 of Figure 1 looking in the direction of the arrows.

With more particular reference to the drawings, the apparatus of the present invention is mounted to the movable end of a universal drafting machine 1. Any type of universal drafting may be used such, for example, as is shown in Patent No. 1,843,424. As is conventional, the universal drafting machine is provided with a fitting 2 to which appliances may be attached.

A central member 3 shaped like a 45° right angle triangle has a plate 3a secured thereto and a fitting 3b secured to the upper surface of the plate 3a. The members 3, 3a and 3b are all rigidly secured together by means of screws 4. The fitting 2 has a channel 2a therein which is adapted to receive the fitting 3b slidably. The right triangle 3 is preferably symmetrically mounted with respect to the fitting 2 and has a pair of straight edges 5 and 6 disposed at right angles to each other. A pivot support plate 8 is secured to the upper surface of right triangle adjacent one of the 45° angles thereof by means of a plurality of screws 9. A scale support plate 10 is pivotally mounted on the pivot support plate by means of a hollow pivot pin 11 and cooperating nut 11a. The line forming the edge of the scale 17 will intersect the axis of the pivot 11 at right angles and it will therefore be seen that the axis of this pivot lies in the same plane as the straight edge 5 and that the hollow pivot will permit the plotting of a point directly at the axis of the pivot.

The scale support plate is provided with an inwardly extending portion 10a which has an arcuate slot 12 formed therein. A fixed stud 13 extends upwardly through the central member 3 and the pivot support plate 8 passes through the slot 12 and has threaded on its upper end a knurled nut 14 which when screwed down serves to lock the scale support plate in any angular position desired with respect to the central member 3.

A scale 16 is secured to an outwardly extending portion 10b of the scale support plate. This scale has a straight edge 17 which is graduated in a plurality of equally spaced divisions, preferably commencing at 0 at the axis of the pivot 11 and as shown in the present embodiment reaching a maximum of 120. The number and spacing of the graduations on this scale may obviously be varied depending on the particular type of work for which the instrument is intended. It is noted that the width and mounting of the scale 16 is such that irrespective of its angular position, its edge 17 will always lie in the same plane as the axis of the pivot 11.

The opposite 45° vertex of central member 3 is provided with a similar pivot support plate 20 for mounting a scale support plate 21 and scale 22 in identically the same relation to the straight edge 6 of the central member as the pivot support plate 8, scale support plate 9 and scale 16 are mounted with respect to the straight edge 5. The scale 22 is substantially the same as the scale 16 and has a straight edge 23 which may be graduated in the same manner. The pivot support plate 20 and scale support plate 21 are connected by means of a hollow pivot 24, the axis of which lies in the same plane as the straight edge 6 and also in the plane of the straight edge 23. A nut 25 serves to hold the scale 22 in predetermined angular position with respect to the straight edge 6 in the same manner as nut 14 holds the scale 16.

The apparatus described above is particularly useful in polyconic projections but is also useful in plotting points on any system of fixed rectilinear coordinate axes.

In polyconic projections of scales customarily used in map work, the central meridian is a straight line and other meridians are in theory curved concavely toward the central meridian. The curvature of these meridians is actually so slight that they are drawn as straight lines and the convergence between adjacent parallels is so negligible that they may be regarded as right angles for all practical purposes. However, it will be apparent that the size of these rectangles will vary as the particular latitude which they represent is changed. It will be apparent therefore that the invention herein disclosed is particularly adjustable for this type of work because of the facility with which it may be adjusted for use with rectangles of different sizes.

Figure 3:
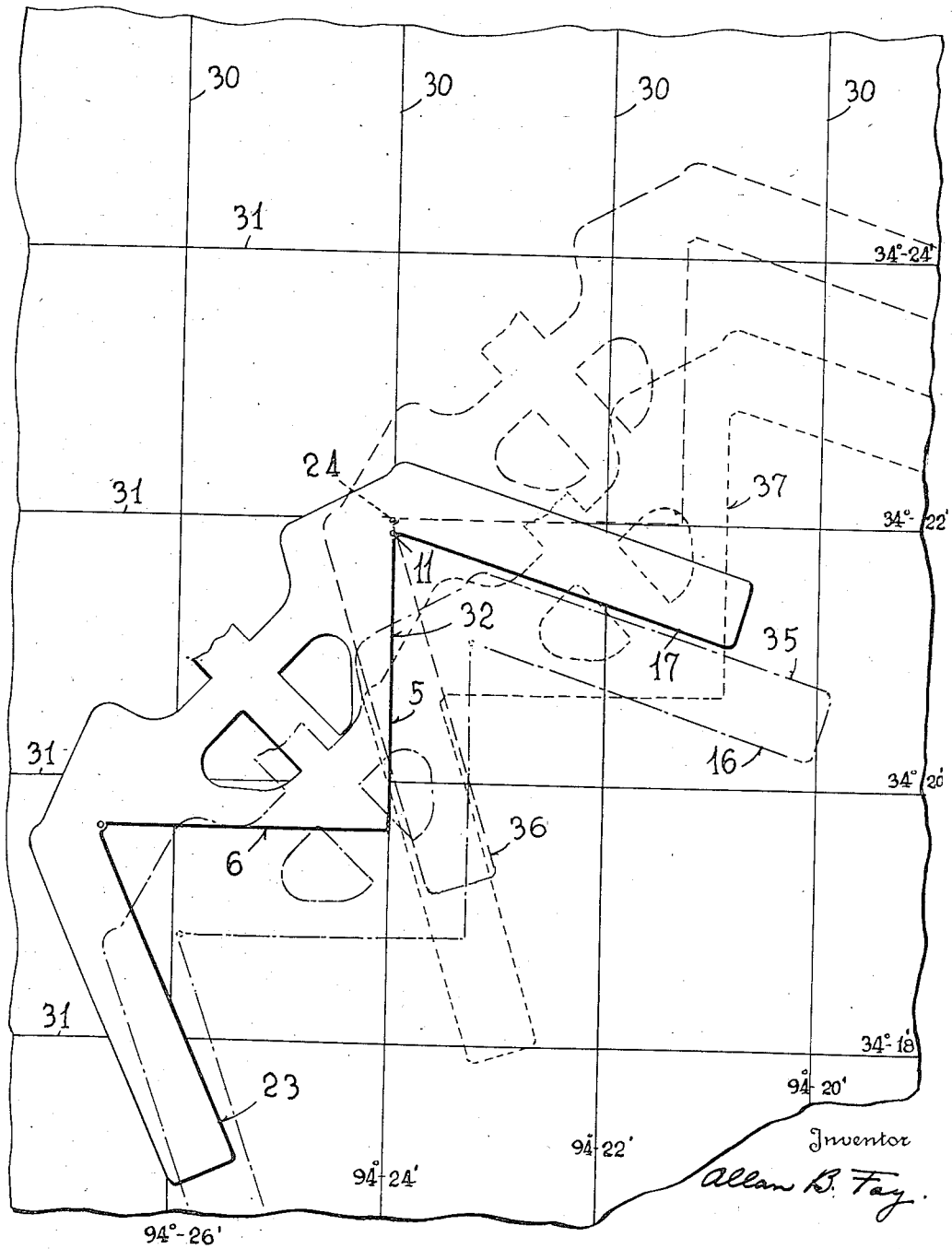
Figure 3 is a diagrammatic view of one use of the apparatus illustrating the successive steps in plotting a point.

In Figure 3 is shown diagrammatically, by way of example, the manner in which the apparatus may be used in plotting points in a polyconic projection.

In Figure 3 is shown a prepared system of coordinates comprising meridians 30 and parallels 31 constructed to represent a polyconic projection of a small section of the earth's surface. It will be noted that both the meridians and parallels are spaced at intervals of two minutes of circular measure. The apparatus is swung into the position shown in the full lines indicated at 32, with the straight edge 5 lying along one of the meridians 30. It will be apparent that due to the mounting of the pivoted scale 16 the zero mark of the scale will be exactly on this meridian. In the illustration given the point to be plotted has a location of 94° 23′ 16.0″ west longitude and 34° 20′ 42.5″ north latitude.

The adjusting nut 14 is loosened and the scale 16 is swung about its pivot until the graduation 120 falls exactly on the meridian next to and to the right of the meridian on which the straight edge 5 has been placed. It will be clear that the graduated scale now divides the distance between the two meridians into 120 equal divisions. Further it will be clear that since the distance between the meridians is 2′ of circular measure the graduations on the scale now each represent 1″ of circular measure.

After the scale 16 has been adjusted to the position described above, the knurled nut 14 is screwed down tight to maintain the angular relation between the scale 16 and the straight edge 5 at a constant. The apparatus as a whole is then moved to the right and due to the action of the universal drafting machine, the straight edge 5 will always remain vertical and the scale 16 will be maintained at a constant angle to the meridians 30 due to the fact that it is locked with reference to the central member 3.

The scale is moved to the right until the graduation 76″ lies exactly upon the meridian 22°. It will therefore be seen that the zero point of the scale is now in a position exactly 76″ to the left of the 22′ meridian. In other words, the zero point of the scale now lies on the meridian 94° 23′ and 16.0″ west longitude. The position of the apparatus at this point is illustrated by the dot and dash lines and designated by the reference character 35. A vertical line may then be drawn upon the projection along the straight edge 5. This line will be the meridian 94° 23′ and 16″ due to the fact that the straight edge 5 and the zero or pivot point of the graduated scale 16 lie in the same vertical plane.

The apparatus is now moved to the position shown by the long dash lines and indicated by the reference character 36 with the zero or pivot point of the scale 22 lying on the parallel 34° 22′. Due to the fact that the straight edges 5 and 6 are at right angles to each other and also to the fact that the pivots 11 and 24 respectively lie in the same vertical plane as these straight edges 5 and 6, it will be seen that when the pivot point 24 is placed on the parallel 34° 22′ the straight edge 6 will lie exactly along this parallel. The scale 22 is then oriented about its pivot until the 120 graduation of this scale lies directly upon the parallel 34° and 20′, thus dividing the rectangle vertically into 120 equal divisions which as will be seen, each represent 1″ latitude. The scale 22 is then locked in position and the apparatus is moved to the position shown by the short dash lines and designated by the reference character 37.

At this point, it will be seen that the graduation 42.5″ lies directly upon the parallel 34° 20′. Consequently the zero point of the scale 22 will lie on a parallel 42.5″ north of the 20′ parallel. A line is then drawn along the straight edge 6 and it will be seen that this line intersects the line which was drawn along the straight edge 5. Consequently, the intersection of these two lines will represent a point whose location is 94° 23′ and 16″ west longitude, and 34° 20′ 42.5″ north latitude.

It will be apparent that the apparatus herein described is particularly adaptable to this sort of work inasmuch as the rectangles in which plotting is done vary slightly as to size, depending upon their latitude, and that one adjustment of the scales 16 and 22 is sufficient for plotting any points within a given rectangle or in all rectangles of the same size. While the apparatus herein disclosed is particularly adaptable to the location of points in polyconic projections, it is apparent that it will be of great aid in plotting points on any system of rectilinear coordinates.

It is apparent that the graduations of the scales 16 and 22 may be varied in accordance with the particular type of work for which it is desired to use the apparatus, and that the divisions of these scales when in the adjusted position represent fractions of the rectangles in which the plotting is to be done.

Although the embodiment of the invention illustrated herein is illustrated specifically in connection with polyconic projections and shows an application in which a map is being made where the location of the points is given in circular measure, it is apparent that the apparatus is susceptible of numerous and various other applications and modifications.

I claim:

1. Drafting apparatus adapted for use in combination with a universal drafting machine comprising a central member having a pair of straight edges disposed at right angles to each other, a pair of graduated scales pivotally mounted on said central member the axis of each of said pivots lying in the same plane as one of said straight edges and means for locking said scales to said central member to maintain a predetermined angle between said scales and the straight edges of said central member.

2. Drafting apparatus for use in combination with a universal drafting machine comprising a central member having a pair of straight edges disposed at right angles with respect to each other, and a pair of graduated scales pivotally mounted on said central member, the axis of each of said pivots lying in the same vertical plane as the edge of one of said straight edges.

3. Drafting apparatus for use in combination with a universal drafting machine comprising a central member having a pair of straight edges disposed at right angles to each other, a pair of scales pivoted to said central member, the axis of each of said pivots lying in the same plane as the edge of one of said straight edges, and graduations on said scale, said graduations indicating the distance along said scale to said straight edge, irrespective of the angular position of said scale with respect to one of said straight edges.

4. Drafting apparatus comprising a central member having a pair of straight edges at right angles to each other, a scale pivoted to said central member, the axis of said pivot lying in the same plane as one of said straight edges, and graduations equally spaced along the edge of said scale from the axis of said pivot whereby said scale will at all times indicate the distance to the adjacent edge of said straight edge along said scale irrespective of the angular position of said scale with respect to said straight edge.

5. Drafting apparatus comprising a central member having a pair of straight edges meeting at right angles, scales pivoted to said central member, the axis of each of said pivots lying in the vertical plane of one of said straight edges, and apertures through the axes of said pivots whereby the location of said axes may be marked.

6. Drafting apparatus adapted for use in combination with a universal drafting machine comprising a substantially flat central member having a pair of straight edges lying on lines which intersect at right angles, and a pair of graduated scales pivotally mounted on said central member, each adjacent that end of one of said straight edges opposite to the point at which the lines of said straight edges intersect.

ALLAN B. FAY.